Figure 1:
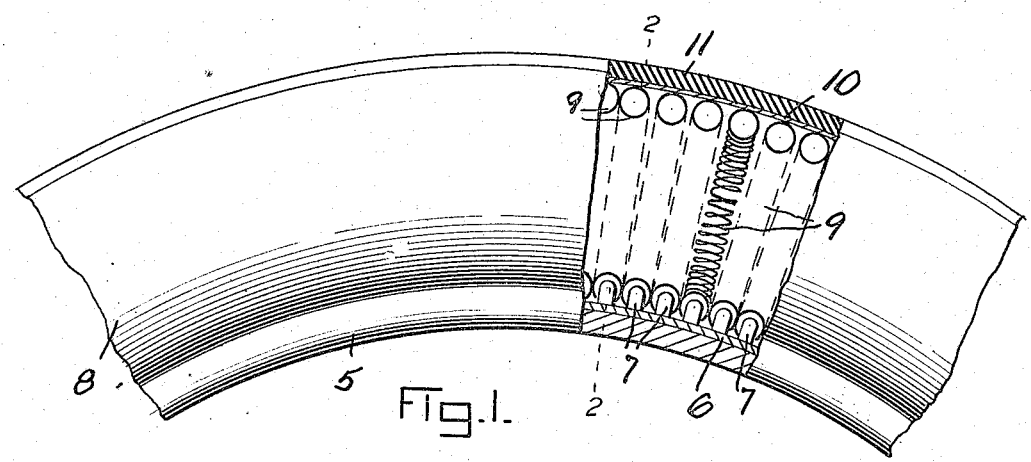

UNITED STATES PATENT OFFICE.

BURT F. NORCROSS, OF WALTHAM, MASSACHUSETTS.

TIRE.

942,097.

Specification of Letters Patent.   Patented Dec. 7, 1909.

Application filed June 18, 1907. Serial No. 379,575.

*To all whom it may concern:*

Be it known that I, BURT F. NORCROSS, a citizen of the United States, residing at Waltham, in the county of Middlesex, State of Massachusetts, have invented certain new and useful Improvements in Tires; and I do hereby declare the following to be a full, clear, and exact description of the invention, such as will enable others skilled in the art to which it appertains to make and use the same.

The present invention relates to improvements in tires, and it aims to provide a device of that class designed especially for wheels of motor vehicles which shall be exceedingly resilient and durable, and which, moreover, shall be constructed as to be practically unharmed by reason of punctures in the tire cover or shoe.

To this end the invention resides in the provision of a series of independently formed spiral loops which are disposed within the tire cover or shoe, to maintain the latter in distended condition, each loop being disposed transversely of the shoe and having its opposite ends fastened to a lug formed upon or set into a steel ring fitted upon the rim of the wheel.

The invention will be readily understood from a consideration of the following detailed description, and its preferred embodiment is illustrated in the accompanying drawings in which like parts are designated by corresponding reference numerals in both views.

Figure 2:
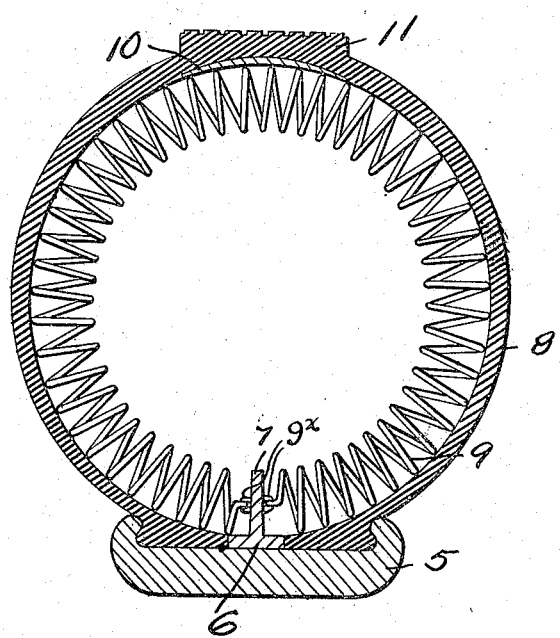

In the said drawings, Figure 1 is a view in elevation, partly in section, of a portion of a tire constructed in accordance with the present invention. Fig. 2 is an enlarged detail transverse section taken on the line 2—2 of Fig. 1.

In the drawings, 5 designates the rim or felly of the wheel upon which is fitted a ring 6 formed of steel and provided upon its outer face with a longitudinally-arranged series of upstanding lugs 7, which are either separately constructed and set into the rim, or formed by projections struck up therefrom, according as desired. The ends of the ring may be fastened to each other in any preferred manner.

The jacket or shoe 8 of the tire, which may be of either the clenched or the tubular type, both of which are equally well known, is held in distended condition by a series of independent loops 9 disposed transversely of the tire and having their opposite ends fastened to the lugs 7 above referred to, the number of loops corresponding to the number of lugs. Each loop is formed by a separate coil spring as shown, the lugs being located sufficiently close to one another to permit the mutually-adjacent springs to contact with each other adjacent the points where they are fastened to the lugs. Owing to this construction, the springs will be prevented from having any appreciable bodily movement toward and from each other. As will be noted by reference to Fig. 2, each lug is furnished with two eyes or staples $9^x$ and through which the terminals of the respective springs are passed. The outer extremities of the several springs bear directly against the under face of a second ring 10, which is likewise disposed interiorly of the shoe 8, said ring consisting of a strip of thin sheet steel whose ends are joined together in any desired manner, the tension of the springs serving to hold the ring in place, though it is to be understood that, if preferred, the shoe and ring may be vulcanized or otherwise secured together. The shoe, may, in addition, be provided with a tread 11 of any preferred construction. Where the tire is of the hose-pipe type, it must be slit longitudinally upon its under face, to enable the ends of the spring loops to be engaged with the ring lugs.

From the foregoing, it will be apparent that the shoe will be held at all times in distended position by the spring loops and will, therefore, be to all intents, subject to no detriment by reason of small punctures.

What is claimed, is,

The combination with a wheel rim, of a flat ring fitted thereupon and formed with a longitudinally arranged continuous series of lugs, each provided on opposite sides with an eye, a tubular tire carried by the rim, a series of transversely arranged loops located within the interior of the tire and corresponding in number to the number of lugs, each loop being formed by a separate helix, the loops having their ends secured in the eyes, and a flat metal ring located within the interior of the tire between the outer portions of the loops and the inner surface of the tire.

In testimony whereof, I affix my signature, in presence of two witnesses.

BURT F. NORCROSS.

Witnesses:
OTIS L. NORCROSS,
HERBERT H. COLBURN.